S. JOHNSTON.
Corn Husker.
No. 27,638.
Patented March 27, 1860.
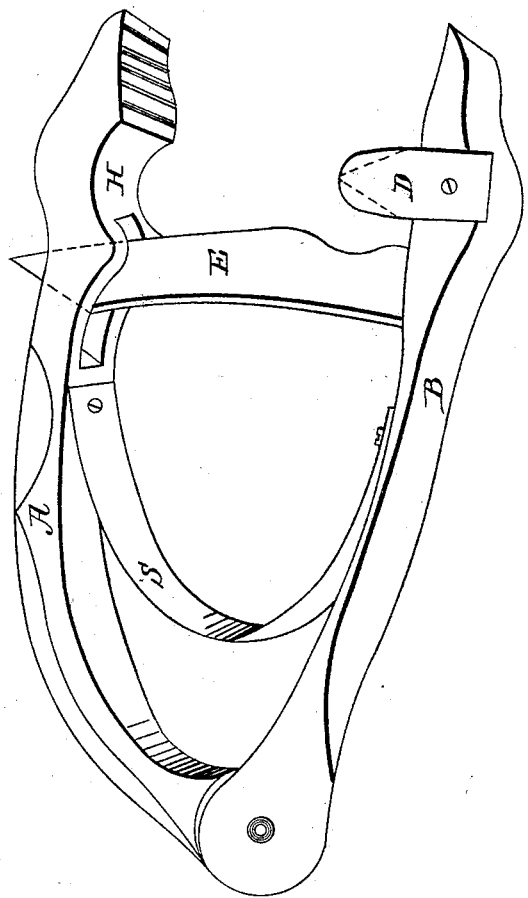
Witnesses.
Geo. H. Hughson
W. L. Shaw
Inventor.
Samuel Johnston

UNITED STATES PATENT OFFICE.

SAMUEL JOHNSTON, OF WEST SHELBY, NEW YORK.

CORN-HUSKER.

Specification of Letters Patent No. 27,638, dated March 27, 1860.

*To all whom it may concern:*

Be it known that I, SAMUEL JOHNSTON, of West Shelby, in the county of Orleans and State of New York, have invented a new Hand Corn-Husker; and I do hereby declare that the following is a full and exact description thereof, reference being had to the accompanying drawings and to the letters of reference marked thereon, which drawing is of the full size of the implement.

The nature of my invention consists in making a hand corn husker, which is held and operated by one hand, independent of any fixtures or fastenings, in a manner similar to the operation of a pair of sheep shears, while the corn to be husked, either when picked or in stooks, or standing on the hill, is held by the other hand.

To enable others skilled in the art to make and use my invention, I will proceed to describe its construction and operation.

I make my husker all of cast iron, except the knife and spring, and somewhat in the form of sheep shears, and having nearly the same movement. It is about six inches long, and of such size otherwise, to give it sufficient strength, and not to make it too heavy for use, as it should not weigh more than a pound. It consists of two fingers, about six inches long, A and B, which are hinged at the back end, and have roughened, grasping surfaces on the inside at the forward end, for the purpose of opening and gripping the husks fast. There is a steel spring on the inside, marked S, attached to one of the fingers, and operating against the other, for the purpose of throwing the fingers open when necessary. Or, instead of having the said fingers hinged and the spring on the inside, they may be made a little shorter, and the spring may be riveted to the back end of each finger, bent in a half circle form. About one inch from the forward end of the fingers, I firmly attach a round or triangular pointed knife, marked D. The triangular form is shown in the drawings by the dotted lines. This knife should extend inward nearly at right angles to the finger, about one half of an inch. The knife may be attached to either finger, on the side so as to cut the stalk close to the butt end of the ear of corn. A fulcrum or cross bar, letter E, is attached to the same finger to which the knife is attached, about one quarter of an inch back of the knife, which is about three inches long, and, extending across the opening between the fingers, passes backward and forward in a slot or opening in the other finger, as the fingers are moved. This cross bar should be attached near or on that side of the finger opposite to the side to which the knife is attached so as to have the same lower than the knife, and in the operation of the implement, the cross bar will form one of the fulcrums against which the stalk rests, as it is partly cut by the knife, and broken off by the leverage obtained between the knife and the forward part of the fingers, as they close on one side of the stalk, and the cross bar E on the other. This cross bar also serves as a stop to aid in adjusting the stalk in order to sever the ear from it, at the proper point. And in order to do this more easily, I also round out the finger, not having the knife attached, near the end, and in the drawings this circular hollow is lettered H.

In using my corn husker, the operator holds it in his right hand, grasping around it near the middle, the same as he would a pair of common sheep shears, with the knife side up, and he grasps the ear of the corn to be husked with the other hand, in the same way he would, if he was going to husk it with his hand. With the finger end of the husker he seizes the husks near the top of the ear and entirely strips off, or down to the butt of the ear without separating from the stalk, husks sufficient to show where the ear should be severed from the stalk. He then grasps the stalk close to the butt of the ear with the fingers of the husker and at the same time that the knife enters the stalk, with the leverage obtained by having the ear in one hand, the husker in the other, acting in opposite directions, the ear is very readily separated from the stalk, and from the husks.

I call my invention a hand corn husker, because it is simply operated by the hand, and both strips off the husks and severs the ear from the stalk.

Having thus described my invention and its operation, what I claim as my invention, is—

The corn husker herein described, consisting of fingers A, B, cross bar E knife D, and spring S, constructed and arranged to operate in the manner and for the purposes specified.

SAMUEL JOHNSTON.

Witnesses:
  GEO. H. HUGHSON,
  W. S. SHAW.